(12) United States Patent
Iseki et al.

(10) Patent No.: US 8,072,542 B2
(45) Date of Patent: Dec. 6, 2011

(54) SAMPLING DEVICE, DISPLAY DEVICE USING SAMPLING DEVICE, AND CAMERA

(75) Inventors: Masami Iseki, Yokohama (JP); Somei Kawasaki, Saitama (JP); Fujio Kawano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1286 days.

(21) Appl. No.: 11/693,291

(22) Filed: Mar. 29, 2007

(65) Prior Publication Data
US 2007/0229692 A1 Oct. 4, 2007

(30) Foreign Application Priority Data

Mar. 31, 2006 (JP) ................................. 2006-098350

(51) Int. Cl.
*H03L 7/00* (2006.01)
(52) U.S. Cl. ........ 348/537; 348/327; 348/518; 348/536; 348/538; 348/571
(58) Field of Classification Search .................. 348/510, 348/342
See application file for complete search history.

(56) References Cited

U.S. PATENT DOCUMENTS

| | | | | |
|---|---|---|---|---|
| 6,335,728 | B1 * | 1/2002 | Kida et al. ................... | 345/204 |
| 2004/0004564 | A1 * | 1/2004 | Hattori ........................ | 341/100 |
| 2004/0183752 | A1 | 9/2004 | Kawasaki et al. | |
| 2005/0007359 | A1 * | 1/2005 | Iseki et al. .................... | 345/204 |
| 2006/0241885 | A1 * | 10/2006 | Ikeda ............................ | 702/108 |
| 2007/0120473 | A1 | 5/2007 | Nakamura et al. ............ | 313/506 |
| 2007/0120779 | A1 | 5/2007 | Nakamura et al. ............. | 345/76 |
| 2007/0146245 | A1 | 6/2007 | Goden et al. .................... | 345/76 |
| 2007/0146246 | A1 | 6/2007 | Nakamura et al. ............. | 345/76 |

FOREIGN PATENT DOCUMENTS

JP    2005-004191    1/2005

* cited by examiner

*Primary Examiner* — Jefferey Harold
*Assistant Examiner* — Omer Khalid
(74) *Attorney, Agent, or Firm* — Fitzpatrick, Cella, Harper & Scinto

(57) ABSTRACT

A correction sampling signal generation circuit is disposed subsequent to a plural-stage sampling signal generation circuit for sequentially generating sampling signals in response to an input timing signal, an extended sampling circuit is disposed subsequent to a plural-stage sampling circuit for sampling a video signal at timing of the sampling signal, and a data signal is sampled at timing of the sampling signal generated by the extended sampling circuit. In a timing adjustment period, the data signal for adjustment is generated, the phases of the data signal and the timing signal are relatively shifted, the outputs of the sampling circuits are supplied to a common output line through respective switches, and the phase of the optimum timing signal or the video signal is determined based on the output from the common output line.

5 Claims, 11 Drawing Sheets

FIG. 10

| S | PERIOD A (N-1)TH STAGE | PERIOD B (N)TH STAGE | PERIOD A (N-1)TH STAGE | PERIOD B (N)TH STAGE | PERIOD A (N-1)TH STAGE | PERIOD B (N)TH STAGE |
|---|---|---|---|---|---|---|
| K PHASE | ph(0) | | ph(1) | | ph(24) | |

SAMPLING DEVICE, DISPLAY DEVICE USING SAMPLING DEVICE, AND CAMERA

BACKGROUND OF THE INVENTION

1. Field of the Invention

The present invention relates to a display device, a driving method thereof, a display panel, and a camera. In particular, the present invention relates to a sampling device which samples a video signal (image signal), a display device which includes the sampling device, and a camera.

2. Description of the Related Art

Generating sampling pulses in a time series and extracting a signal at each time from data signals are executed in many kinds of signal processing devices. Here, to sample the signal corresponding to a predetermined pixel from video signals in a display device of displaying images is included in such a process.

In a case where the video signals are processed inside the display device, the time difference between a sampling signal (that is, the signal which is used for sampling) and a sampling-object signal (that is, the signal for which sampling is performed) occurs due to a propagation delay of a circuit. Here, a variation (or dispersion) occurs in such a delay time due to a change in characteristics of circuits provided inside the display device, a change in an environment, and the like.

Incidentally, when sampling is executed, if the timing of a sampling pulse (signal) and the timing of the sampling-object signal do not satisfy a predetermined relation, it is impossible to execute accurate sampling.

For this reason, it is necessary to adjust the timing of the sampling signal so as to be able to execute accurate sampling. More specifically, it is necessary to adjust and generate a phase for a reference clock signal of the sampling pulse so that the sampling pulse has optimum timing for the sampling-object signal when it is transmitted to a sampling circuit.

Japanese Patent Application Laid-Open No. 2005-004191 discloses a method of sweeping a certain range of phases of sampling pulses as detecting sampling outputs, and setting the phase of the maximum output as an optimum phase. In this method, to make the phase optimum, it is necessary to provide a circuit that measures the outputs and acquiring the maximum value.

Incidentally, when the sampling result is converted into the output, if a variation of input/output conversion characteristics occurs among the respective sampling circuits, the output acquired from the sampling result does not correctly reproduce the original data signal even if the sampling is accurately executed.

In the display device, a display data generation circuit for sampling the video signals and outputting the acquired signals as display data is one kind of, so-called, sampling devices. However, if the signal to be transmitted to the display device includes a variation which is not included in the input video signal, the display quality at the display device remarkably deteriorates.

United States Patent Application Published No. 2004/0183752 discloses, as a method of detecting and correcting characteristic variations of respective sampling circuits, a method of commonly connecting current outputs of the respective sampling circuits to make them as one current output, measuring the acquired current output by an external current measuring circuit, and then correcting a data signal based on the measured current output.

Thus, in the display device, the method of commonly connecting the sampling circuit outputs to the current measuring device is frequently used to correct the variation of the sampling circuit. In that case, it is necessary to provide the circuit for correcting the variation in addition to the above-described timing correction circuit, whereby the whole circuit constitution of the sampling device becomes complicated.

SUMMARY OF THE INVENTION

A display device according to the present invention includes a sampling device comprising:

(a) a timing signal generation circuit adapted to generate a timing signal delayed with respect to a reference clock signal;

(b) a control circuit adapted to control a delay time of the timing signal;

(c) a data generation circuit adapted to generate a serial data signal;

(d) an N-stage shift register, to which the timing signal is input, adapted to sequentially generate sampling pulses in sync with the timing signal;

(e) a sampling circuit, connected to any one of the stages of the shift register and the data generation circuit, adapted to sample the serial data signal during a period that the sampling pulse of the relevant stage is generated, and to output a current according to a sampling result; and (f) a common output line commonly connected to respective current outputs of the sampling circuit through a switch, wherein the sampling circuit includes M sampling circuits respectively connected to continuous first to M-th (<N−1) stages of the N-stage shift register, and a sampling circuit connected to a last stage of the shift register, following operations (1) to (3) are executed during a period that the switch is closed, (1) the data generation circuit generates N serial data signals of which the last is data giving a maximum current and the others are data giving a minimum current, (2) the timing signal generation circuit generates the timing signal delayed with respect to the reference clock signal, and (3) the control circuit measures an output current of the common output line as sweeping of the delay time of the timing signal occurs, and decides and stores the delay time at which the measured current becomes a maximum within a range of the sweeping, and following operations (4) to (6) are executed during a period that the switch is released, (4) the control circuit fixes the delay time of the timing signal to the stored delay time, (5) the data generation circuit generates the serial data signal based on an externally input signal, and (6) the timing signal generation circuit generates the timing signal on the fixed delay time to the serial data signal based on the externally input signal.

Alternatively, in the above characteristic, the sampling circuit may include M sampling circuits respectively connected to continuous M (<N) stages of the shift register including a last stage of the N-stage shift register, and a sampling circuit connected to a first stage of the shift register. In such a case, when the above operation (1) is executed, the data generation circuit generates N serial data signals that the last thereof is data giving a maximum current and other are data giving a minimum current.

According to the present invention, the circuit for adjusting the timing and the circuit for correcting the variation of the respective sampling circuits can be made in common, whereby it is possible to simplify the whole circuit structure of the sampling device. In particular, since both the adjustment of the timing and the correction of a variation of the sampling circuits are necessary in the display device, it is

BRIEF DESCRIPTION OF THE DRAWINGS

FIG. 10 is a block diagram chart for describing the operation to be executed in a correction period according to the fourth exemplary embodiment.

DESCRIPTION OF THE EXEMPLARY EMBODIMENTS

In the present application, a "phase" implies a time location of a clock signal being a reference within one period. For example, a signal which shifts from the clock signal by a half period is called a signal whose phase shifts by 180°. A signal that is time-delayed from the clock signal has a phase corresponding to the ratio of the delay time to one period of the clock signal. In the present application, on the premise of such relations, the phase is often used to mean the delay time. Here, it is assumed that the direction in which the delay time is prolonged in relation to the reference clock is a forward direction of phase, and that the signal that has advanced to exceed the reference clock has a negative phase.

In the following, exemplary embodiments of the present invention will be described in detail with reference to the attached drawings.

First Exemplary Embodiment

Figure 1:
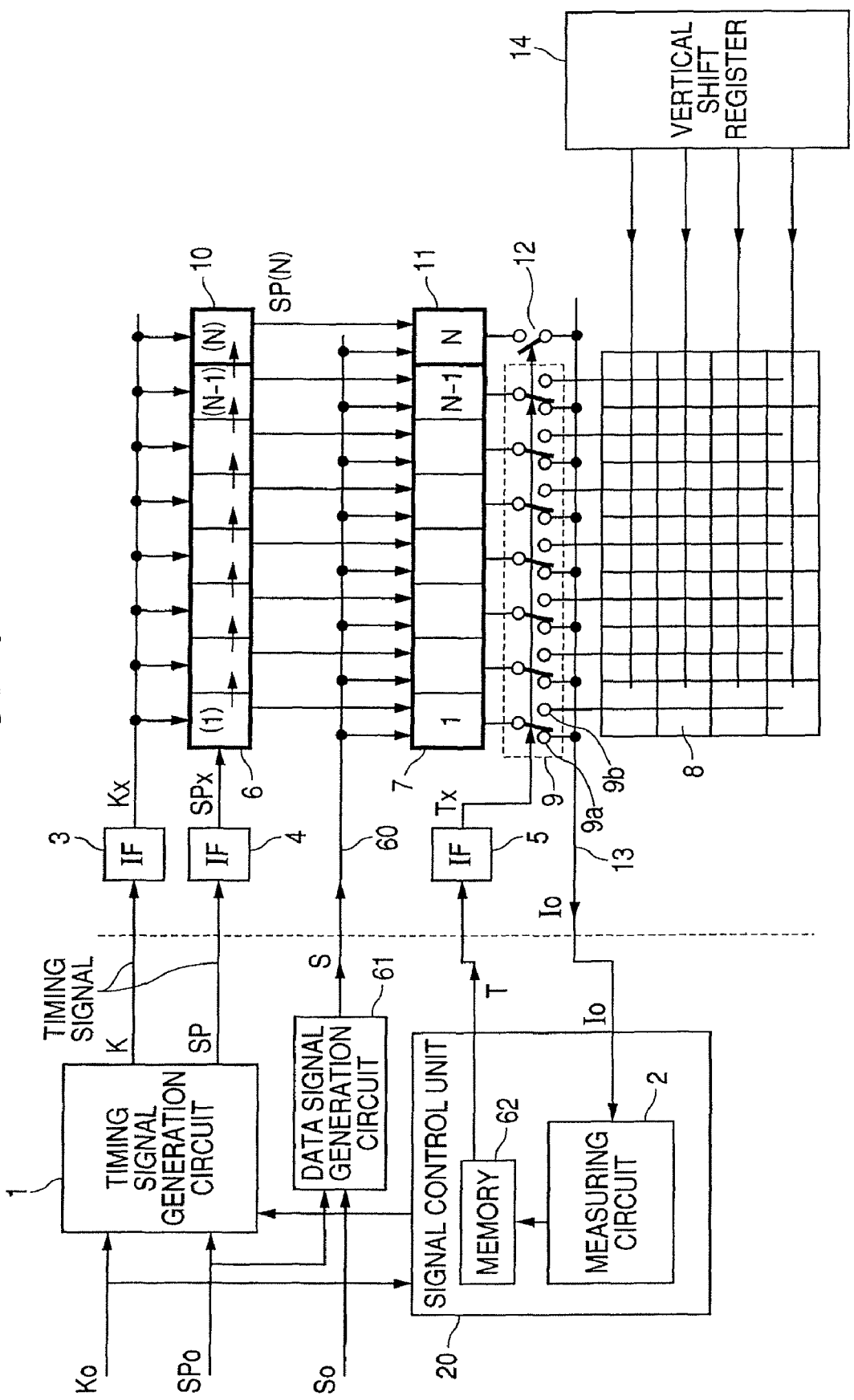
FIG. 1 is a block diagram for describing a first exemplary embodiment of the present invention.

FIG. 1 is a block diagram illustrating a display device according to the first exemplary embodiment of the present invention.

In FIG. 1, the right portion from the vertical dotted line indicates an active matrix electroluminescence display panel (called an EL panel hereinafter) which is made through a low-temperature polysilicon process. Further, the EL panel includes an image display section 8 in which organic EL elements and their driving circuits are arranged like a matrix, and a vertical shift register 14 which sequentially supplies scanning voltage to the row electrodes of the image display section 8. In any case, the organic EL element is a current driving element whose light emission luminance is determined by current, and current data is supplied to each pixel from the electrode in a column direction.

On the other hand, the left portion from the vertical dotted line in FIG. 1 indicates a circuit for supplying signals to the EL panel. Here, this circuit includes a timing signal generation circuit 1, a data signal generation circuit 61, and a signal control unit (or simply called a control unit hereinafter) 20 which controls phases of the signals generated therefrom. The control unit 20 further includes a measuring circuit 2 and a memory 62. Incidentally, the measuring circuit 2 receives and measures current supplied from a common signal line, and the memory 62 stores a detection result generated from the measuring circuit 2. Further, the control unit 20 transfers a control signal to the timing signal generation circuit 1 so as to control the phase shifted from the reference clock of a timing signal.

The timing signal generation circuit 1 generates the timing signal based on an externally supplied reference clock signal Ko and an externally supplied horizontal sync signal SPo being the basis for sampling timing.

Then, the generated timing signal includes a clock signal K and a sampling signal (or sampling start signal) SP.

The clock signal K is generated in sync with the reference clock signal Ko, and supplied to each stage of a shift register 6 through a level conversion circuit (IF) 3, thereby shifting the data in the shift register 6. The sampling signal SP is supplied to the first stage of the shift register 6 through a level conversion circuit (IF) 4, and the level thereof becomes H (high) by one clock period in sync with the horizontal sync signal SPo.

As described below in detail, the clock signal K is generated by the timing signal generation circuit 1 with a certain delay from the reference clock signal Ko, and also the sampling signal SP is generated by the timing signal generation circuit 1 with a certain delay from the horizontal sync signal SPo. Here, such a delay time is determined by the signal control unit 20 itself or based on the input from the memory 62 storing the detection result of the measuring circuit 2. In any case, the timing signal generation circuit 1 generates the sampling signal SP with the certain delay time from the horizontal sync signal SPo, by the operation of a not-illustrated internal circuit provided in the signal control unit 20. Also, the timing signal generation circuit 1 generates the clock signal K with the same delay time as that for the sampling signal SP from the reference clock signal Ko.

The data signal generation circuit 61 generates the data having a certain length in a time series. The time when the data signal generation circuit 61 starts to generate the data is synchronous with the horizontal sync signal SPo. More specifically, the data signal generation circuit 61 starts to generate the data with the certain delay time from the horizontal sync signal SPo.

Here, the number of data included in one serial data signal S supplied by the data signal generation circuit 61 is equal to the number ((N−1) in FIG. 1) of columns on the display panel of the image display section 8 in the ordinary display device. That is, the serial data signal S is the serial data signal in which (N−1) data are arranged in serial, and, if it is assumed that a time allocated to one data is Ts, the length of the serial data signal S is (N−1)·Ts.

In the present invention, the serial data signal S is the serial data signal to which one or more additional data have been added, and the number of data to be added is set to be equal to the number of additional registers to be added to the shift register as described below. That is, the number of data in the serial data signal S is equal to the number of stages of the shift register lengthened by the additional registers. For example, in FIG. 1, the number of additional data is "1", whereby the number of data included in the serial data signal S is N and the length thereof is N·Ts.

Incidentally, in the display device like this, the serial data signal S is an analog voltage signal whose voltage level varies within a certain range according to image data. More specifically, the maximum voltage level corresponds to the signal representing a maximum luminance, that is, "white", the minimum voltage level corresponds to the signal representing a minimum luminance level, that is, "black", and the intermediate voltage levels correspond to the signals representing intermediate luminance levels. Then, the serial data signal S generated by the data signal generation circuit 61 is supplied to a data line 60 as a voltage.

The signal control unit 20 generates a control signal T for discriminating an image display period from a sampling timing adjustment period. Subsequently, the control signal T is subjected to level conversion through a level conversion circuit (IF) 5, and a level-converted control signal Tx is then generated and input to the control terminals of a switch group 9. That is, the level conversion circuits 3, 4 and 5 convert the respective signal levels. In general, the timing signal generation circuit 1 provided outside the EL panel is made through a CMOS (complementary metal-oxide semiconductor) process, and the amplitude of its generated timing signal is 3.3V or so, whereby the operation voltages to be applied inside the EL panel are level-converted to 10V or so through the level conversion circuits 3, 4 and 5. More specifically, the clock signal K is level-converted by the level conversion circuit 3 and then input to the shift register 6 as a signal Kx, and the sampling signal SP is level-converted by the level conversion circuit 4 and then input to the shift register 6 as a signal SPx.

The number of stages of the shift register 6 is equal to the number ((N−1) in FIG. 1) of columns of the image display section. If the sampling signal SP becomes a H level by only one clock period, then the respective stages sequentially shift to the H level at a timing of the rise or fall of the timing signal K. More specifically, the register of one stage (assumed as k-th stage) outputs a signal of H level when the stage itself is in H level, and the relevant output signal is the sampling signal SP(k).

A sampling circuit group 7 includes plural sampling circuits.

The serial data signal S and the sampling signals (SP(1), SP(2), . . . ) of the respective stages of the shift register 6 are input to the respective sampling circuits of the sampling circuit group 7. Then, each sampling circuit samples the serial data signal S at timing of corresponding one of the sampling signals (SP(1), SP(2), . . . ), executes voltage/current conversion to the sampled data by a not-illustrated voltage/current conversion (Gm) circuit included in the relevant sampling circuit, and outputs the converted data as current data through the output terminal.

The switch group 9 connects each output terminal of the sampling circuit group 7 to either a terminal 9a or a terminal 9b according to a polarity of the control signal Tx. Here, the terminal 9b is connected to the data line of the image display section 8, and the terminal 9a is connected to a common output line 13.

In the case where the sampling circuit of the sampling circuit group 7 includes the voltage/current conversion circuit and outputs the current data (current signal), an output Io of the common output line 13 corresponds to the sum total of the currents of the output current data. Besides, in a case where the sampling circuits output voltage signals, a pull-down resistor is added to the common output line 13 so as to acquire a voltage of a wired-OR logic circuit.

The display device illustrated in FIG. 1 has two operation modes, that is, an image display mode and a sampling timing adjustment mode. More specifically, the display device operates to switch these operation modes in response to whether an output of a control signal T is L level (image display mode) or H level (sampling timing adjustment mode).

During a period that the display device is in the image display mode, the serial image data signal S is transmitted from the data signal generation circuit 61 based on an externally supplied analog video voltage signal So. Then, the sampling circuit group 7 outputs a current signal according to the image data of each column of the image display section 8. Here, since the output terminal of the sampling circuit group 7 is being connected to the terminal 9b in the switch group 9 based on the control signal Tx level-converted from the control signal T, the current signal output from the sampling circuit group 7 is supplied to the electrodes of the (N−1) columns of the matrix-like image display section 8. Then, the current data is supplied to the column electrode every time a scanning signal is supplied in sequence to the scanning electrode in the row direction. As a result, the output of the sampling circuit group 7 is supplied to each pixel of the image display section 8, whereby image display is executed based on the analog video voltage signal.

On the other hand, during a period that the display device is in the sampling timing adjustment mode, the output of the sampling circuit group 7 is connected to the common output line 13 by means of the switch group 9, whereby a sum total signal (sum total current or wired-OR voltage) is acquired from the common output line 13.

The common output line 13 is connected to the measuring circuit 2 which measures the current or the voltage on the common output line 13, and transfers measured results to the signal control unit 20. Then, the signal control unit 20 calculates the timing at which the output of the measuring circuit 2 in the sampling timing adjustment mode becomes a maximum, stores therein the calculated timing, and then transfers the stored timing to the timing signal generation circuit 1.

Incidentally, the switch group 9, the common output line 13 and the measuring circuit 2 illustrated in FIG. 1 are provided in order to correct a variation in the output currents of the columns of the voltage/current conversion circuits (not illustrated) included in the sampling circuit group 7. Here, it should be noted that these circuits were proposed in United States Patent Application Published No. 2004/0183752 by the same inventors as those of the present application. In the following, the outline of the relevant circuits will be described.

That is, during a period other than the image display period, the signals for correcting in-column variation are supplied as the sampling-object signals S, and the sampling circuit group samples the supplied sampling-object signals S. At the same time, if the switch group 9 is set to the side of the terminal 9a, the sampled signals are output from the Gm circuit to the common output line 13 as the sum total current, and the output signals are then detected by the measuring circuit 2.

The signals for correcting the in-column variation are the signals which are produced from the serial data, i.e., the data corresponding to one horizontal line, whose number is equal to the number (assumed as N only in this description) of columns, and are arranged in a time series, and these signals are classified into N kinds including following S(1) to S(N):

S(1) . . . first column is white signal, and second to N-th columns are black signals;
S(2) . . . second column is white signal, and first and third to N-th columns are black signals;
S(3) . . . third column is white signal, and first, second and fourth to N-th columns are black signals;
S(N) . . . N-th column is white signal, and first to (N−1)th columns are black signals.

That is, these signals are sequentially transmitted as the sampling-object signals S externally.

When the signal of S(1) is given, the first-column Gm circuit outputs the maximum current corresponding to the white signal, and other Gm circuits output the minimum current (i.e., zero) corresponding to the black signal. At this time, the sum total current detected by the measuring circuit 2 is equal to the maximum output value of the first-column Gm circuit. Likewise, when the signals of S(2), S(3), . . . , and S(N) are respectively given, the maximum output values of the corresponding Gm circuits are respectively detected. Thus, an average value is acquired from the maximum current output values, and the ratio of the maximum current output value to the average value is set as a correction coefficient for the corresponding Gm circuit. In the actual image display, a signal which is acquired by multiplying the image signal by the correction coefficient is produced, and thus corrected image signal is given as the sampling-object signal S. Even if the minimum current output value is not zero but includes a leakage current, the correction coefficient can be determined The above is the outline of the invention proposed in United States Patent Application Published No. 2004/0183752.

The present invention is directed to adjust sampling timing, and the whole circuit constitution to achieve such adjustment can be further simplified by using the switch group 9, the common output line 13 and the measuring circuit 2 provided for correcting the in-column variation to the present invention.

In the following description, the characteristic portion of the present invention as illustrated in FIG. 1 and its operation will be described. In the following description, it is assumed that the number of columns is (N−1).

In the present exemplary embodiment, the circuit illustrated in FIG. 1 is characterized by providing an additional register 10 which is adjacent to the last (N−1) stage of the shift register 6 and an additional sampling circuit 11 which corresponds to the additional register 10 and to which an output signal SP(N) of the additional register 10 and the serial data signal S are input.

The additional register 10 which is made by the same circuit as that of each stage of the shift register 6 is connected to the last stage of the shift register 6. Thus, the shift register 6 having the (N−1) stages and the additional register 10 together constitute the continuous shift register having the N stages, and the additional register 10 acts as the N-th stage (last stage). Therefore, after the shift register 6 sequentially outputs the sampling signals SP(1), SP(2), . . . , and SP(N−1), the additional register 10 successively outputs the last sampling signal SP(N).

The additional sampling circuit 11 is made by the same circuit as each sampling circuit included in the sampling circuit group 7, and the serial data signal S and the output of the additional register 10 are input to the additional sampling circuit 11. If the register 10 which acts as the last stage of the N-stage shift register outputs the sampling signal SP(N) to the sampling circuit 11, also the serial data signal S is input to the sampling circuit 11 at the appropriate timing. Incidentally, a switch 12 is provided between the output terminal of the additional sampling circuit 11 and the common output line 13, and the timing signal Tx is supplied to the control terminal of the switch 12, whereby the switch 12 operates in cooperation with the operation of the switch group 9. If the switch group 9 is set to the side of the terminal 9a and the sampling output current is supplied to the common output line 13, also the switch 12 supplies the output of the sampling circuit 11 to the common output line 13. On the other hand, if the switch group 9 is set to the side of the terminal 9b, the switch 12 is released (or opened).

In the present invention, as well as the correction of the in-column variation, the adjustment of the sampling timing is executed by providing a sampling timing adjustment period other than the image display period. More specifically, the sampling timing adjustment period is properly provided within a vertical blanking period, at the time of standby after the end of display, or before power off by a power-off operation. If both the correction of the in-column variation and the adjustment of the sampling timing are executed, separate periods are provided respectively for such operations. Incidentally, it is preferable to execute the adjustment of the sampling timing before the correction of the in-column variation.

In the sampling timing adjustment period, as well as the image display period, the timing signal generation circuit 1 generates the clock signal K and the sampling signal S. However, their phases (delays from Ko and SPo) are not set based on the output from the measuring circuit 2. Namely, as described below, the signal control unit 20 sets a unique delay time so as to cause the timing signal generation circuit 1 to generate the timing signal with the set delay time. Besides, in the sampling timing adjustment period, the signal control unit 20 sets the control signal T to H level, whereby the switch group 9 and the switch 12 supply the outputs of the sampling circuit group 7 and the additional sampling circuit 11 to the common output line 13.

Figure 2:
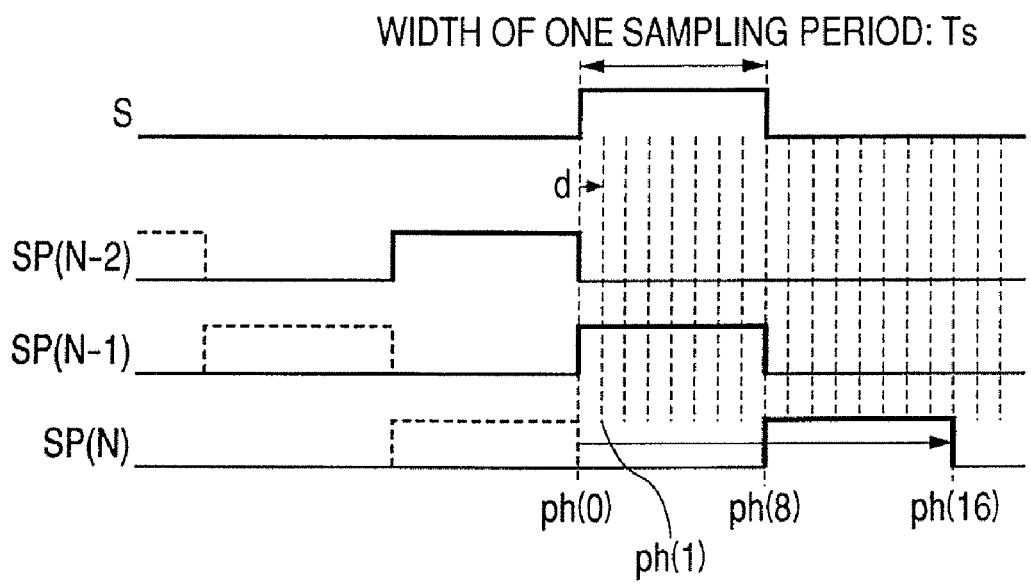
FIG. 2 is a timing chart for describing the operation in FIG. 1.

FIG. 2 is a timing chart of the sampling timing adjustment period. As illustrated in FIG. 2, the serial data signal S is generated by the data signal generation circuit during the sampling timing adjustment period. Further, if the sampling signal (or sampling pulse) SP is input to the shift register 6 during the sampling timing adjustment period, the serial signals SP(N−2), SP(N−1) and SP(N) respectively corresponding to the (N−2)th stage, the (N−1)th stage and the N-th stage (register 10) of the shift register are output.

The serial data signal S for adjusting the timing in the sampling timing adjustment period is equal to the N-th sampling-object signal S(N) when the in-column variation of the previously described voltage/current conversion circuit in the sampling circuit is corrected. That is, the serial data signal S includes the (N−1) black signals (corresponding to one horizontal line in this case) and the later-added one-bit white signal.

In other words, FIG. 2 illustrates that, as the serial data signal S, the white signal having the width of one sampling period (Ts) is added after the serial data in which the black signals of one horizontal line continues.

The specific serial data signal S of this type produced in the sampling timing adjustment period includes two-level voltage signals. Thus, when the sampling circuit samples the two-level voltage signals, it is set to selectively output the maximum current and the minimum current.

The sampling-object signal S and the sampling signal SP are respectively produced in the timing signal generation circuit 1 at a timing fixed in regard to the horizontal sync signal SPo being the basis of horizontal scanning. Here, as described above, when the sampling-object signal S and the sampling signal SP are input to the sampling circuit through the respective paths, the respective timings vary due to delays that have occurred at several circuits, and it is difficult to predict the amount of such variation because there is a variation in the characteristics of the circuits. However, it is possible to acquire the optimum timing by providing a period for adjusting the timing previous to the actual signal sampling operation for each sampling circuit.

To adjust the sampling timing, it only has to slightly shift and generate the phases of the sampling signal SP in the timing signal generation circuit 1, acquire a sampling charge at each phase (that is, the sampling-object signal S has been stored as electrical charges in the sampling circuit), measure the magnitude of the acquired charge, and set the phase at which the charge is maximum as the optimum timing of the sampling signal SP.

Figure 3:
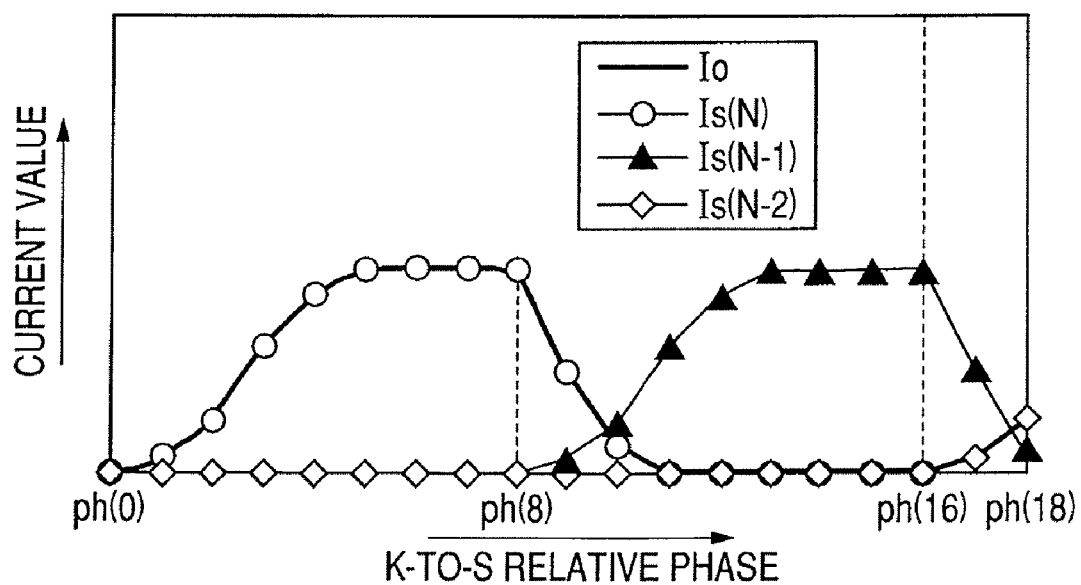
FIG. 3 is a diagram for describing sampling phase detection in the first exemplary embodiment.

FIG. 3 illustrates changes of the input currents of the measuring circuit 2 when the phases are shifted. That is, since the phase of the sampling-object signal is fixed and the phases of the clock signal K and the sampling-object signal S are shifted together, the relative phases of the clock signal K to the sampling-object signal S are plotted along the horizontal axis.

In the present exemplary embodiment, the phase of the sampling signal SP which is acquired when an individual pulse of the sampling-object signal S is maximally sampled by the N-th stage correction sampling circuit 11 is set as the optimally corrected sampling timing.

Incidentally, the operations of the respective circuits to be executed during the sampling timing adjustment period will be roughly described as below.

Since the timing signal generation circuit 1 generates the clock signal K and the sampling signal SP, the phases (delay times) of these signals are not set based on the output of the measuring circuit 2 but are set by the timing signal generation circuit 1 itself during the sampling timing adjustment period. The phases of the clock signal K and the sampling signal SP sequentially shift for every period (time) that is shorter than the period of the clock signal K (⅛ of the period of the clock signal K in FIG. 2), and such a variation due do the shifted phases is swept within a certain range (two clock periods in FIG. 2).

Incidentally, if the sampling signal SP is generated at a certain phase (e.g., ph(0)) and the sampling by the sampling circuits 7 and 11 ends, a sum total current Io output from the sampling circuits 7 and 11 to the common output line 13 is measured by the measuring circuit 2, and the measured result is stored as current data Imax(0) and phase data ph(0).

Likewise, the current Io is measured repeatedly as shifting the phases ph(1), ph(2), . . . , in due order.

Then, if the measured current value at the phase ph(k) is larger than the previously stored current value Imax, the measuring circuit 2 replaces the stored current value Imax with the newly measured current value, and stores the replaced current value. Moreover, the measuring circuit 2 updates the phase data to ph(k), and holds the updated phase data ph(k). On the other hand, if the current value on the common output line at the phase ph(k) is smaller than the held current value of the current Io, the measuring circuit 2 still holds the current data and the phase data without changing them. Thus, the maximum current value and the phase at that time remain as the final result.

During the image display period, the phase of the sampling signal SP is fixed as it is, and the timing of generating a video signal being the sampling-object signal is adjusted so that the relevant sampling-object signal comes to the end (N-th column signal) of the video signal in one horizontal period, whereby the video signal is correctly sampled at each stage of the shift register.

In the following, the timing chart illustrated in FIG. 2 will be described concretely.

In FIG. 2, the phase of the sampling signal is disclosed as the fall timing of the sampling signal SP(N).

Here, it is assumed that the phase of the sampling signal at the time of starting the sampling timing adjustment is ph(0). In FIG. 2, the sampling signals SP(N−2), SP(N−1) and SP(N) respectively for the sampling timing adjustment of the (N−2)th stage, the (N−1)th stage and the N-th stage at the phase ph(0) are disclosed by the dotted lines.

At the phase ph(0), since the sampling-object signal S and the sampling signal SP(·) do not overlap temporarily, both the output currents of the sampling circuit group 7 and the sampling circuit 11 are zero. The sum total current Io output from the sampling circuit group 7 and the sampling circuit 11 to the common output line 13 is measured by the measuring circuit 2, and the sum total current on the common output line 13 at the phase ph(0) is thus set to Imax(0)=0 and then stored together with the phase data ph(0).

Subsequently, the timing signal generation circuit 1 changes or shifts the phases of the clock signal K and the sampling signal SP from ph(0) to ph(1) by a period "d". In FIG. 2, such a phase change of one step is set to ⅛ of the sampling pulse width, whereby d=Ts/8 is given.

At the phase ph(1), the N-th sampling signal SP(N) overlaps the sampling-object signal S, whereby the N-th stage sampling circuit 11 executes sampling during the period "d". However, since such an overlap period is very short, only the sum total sampling output current slightly larger than that at the phase ph(0) is output to the common output line 13. Then, if the current value on the common output line 13 at the phase ph(1) is equal to or larger than the held maximum value Imax(0), the measuring circuit 2 sets the sum total current on the common output line 13 as the maximum value Imax(1), and updates and holds the phase ph(1) as the phase data Dp(1). On the other hand, if the current value on the common output line 13 at the phase ph(1) is smaller than the held maximum value Imax(0), the measuring circuit 2 does not change the maximum value Imax(0), and holds it and the phase data Dp(0) directly.

After then, if the above operation is repeated as changing or shifting the phase "d" by "d", the overlap comes to be a maximum at the phase ph(8) within the range that the fall of the N-th stage sampling signal SP(N) does not exceed the fall of the sampling-object signal S, as illustrated in FIG. 3, whereby the sampling output comes to be a maximum. Then, if the phase is further shifted, the overlap decreases oppositely, and thus the current output decreases, whereby the maximum value Imax(8) and the phase data Dp(8) are maintained. As a result, the phase data having the maximum value of the sum total current is the data at the phase ph(8).

After the phase detection ends, the clock signal K and the sampling signal SP are generated at the phase that the sum total current in the sampling reaches a peak, and the video signal is generated so that an individual pulse of the fixed phase comes to be the end of the video signal, whereby a suitable sampling operation can be achieved. Besides, it should be noted that the output phases of the clock signal K and the sampling signal SP are not limited to the peak of detection. That is, the output phase may be determined so as to correlate with the detected peak phase. For example, it is possible to set the output phase to a value having an offset from the peak phase.

In the above description, the register 10 and the sampling circuit 11 added for adjusting the sampling timing are disposed respectively at the subsequent stages of the shift register 6 and the sampling circuit group 7. However, the same effect as that described above can be achieved even if the additional register 10 and the additional sampling circuit 11 are disposed respectively at the previous stages of the shift register 6 and the sampling circuit group 7. In that case, the video signal is generated so that the starting edge of the video signal coincides with an individual pulse phase within a horizontal period.

As described above, in the present exemplary embodiment, the sampling circuit 11 is connected to the common output line 13 through the switch 12 during the sampling timing adjustment period, the phase of the sampling signal SP is sequentially shifted in regard to the sampling-object signal S for sampling timing adjustment, and the output on the common output line 13 is detected. Then, the phases of the timing signal and the analog video signal are adjusted based on the output from the common output line.

Incidentally, it is possible to provide a period for correcting the in-column variation other than the above sampling timing adjustment period. Further, during the period for correcting the in-column variation, it is possible to connect the sampling circuit group 7 to the common output line 13 through the switch group 9, detect the output from the common output line 13, and then correct the analog video signal so as to eliminate the in-column variation. Such a technique is disclosed in United States Patent Application Published No. 2004/0183752

The sampling timing adjustment period and the in-column variation correction period both described above may be set except for the image display period. Further, the sampling timing adjustment period and the in-column variation correction period may be successively provided or may be separately provided.

Second Exemplary Embodiment

In the above first exemplary embodiment, if the phase sweeping range (i.e., phase detection range) is widened to exceed one sampling period, there is a fear that because plural detection peaks appear, preferable phase detection cannot be achieved.

More specifically, if it is assumed in FIG. 2 that the phases ph(8) to ph(16) are included in the phase detection range, the same output as that in the sampling of the phase ph(0) to the phase ph(8) by the sampling circuit 11 is output to the common output line 13 at the (N−1)th stage of the sampling circuit group 7. At that time, two detection peaks appear within the phase detection range from the phase ph(0) to the phase ph(16). In general, as the phase sweeping range is wider, it is preferable because the probability of capturing the optimum timing increases. However, if there are two detection peaks, preferable phase detection cannot be achieved if the start and the end of sweeping are not satisfactorily selected. For example, in FIG. 2, if the phase sweeping is executed from the phase ph(8) to the phase ph(16), the second peak is measured, whereby the phase ph(16) at which the second peak has the maximum value is set as an optimum-timing phase.

In this point of view, according to the second exemplary embodiment, the number of detection peak is set to one even if the phase detection range is widened. In other words, sampling phase setting with the phase detection range widened is executed in the present exemplary embodiment.

Figure 4:
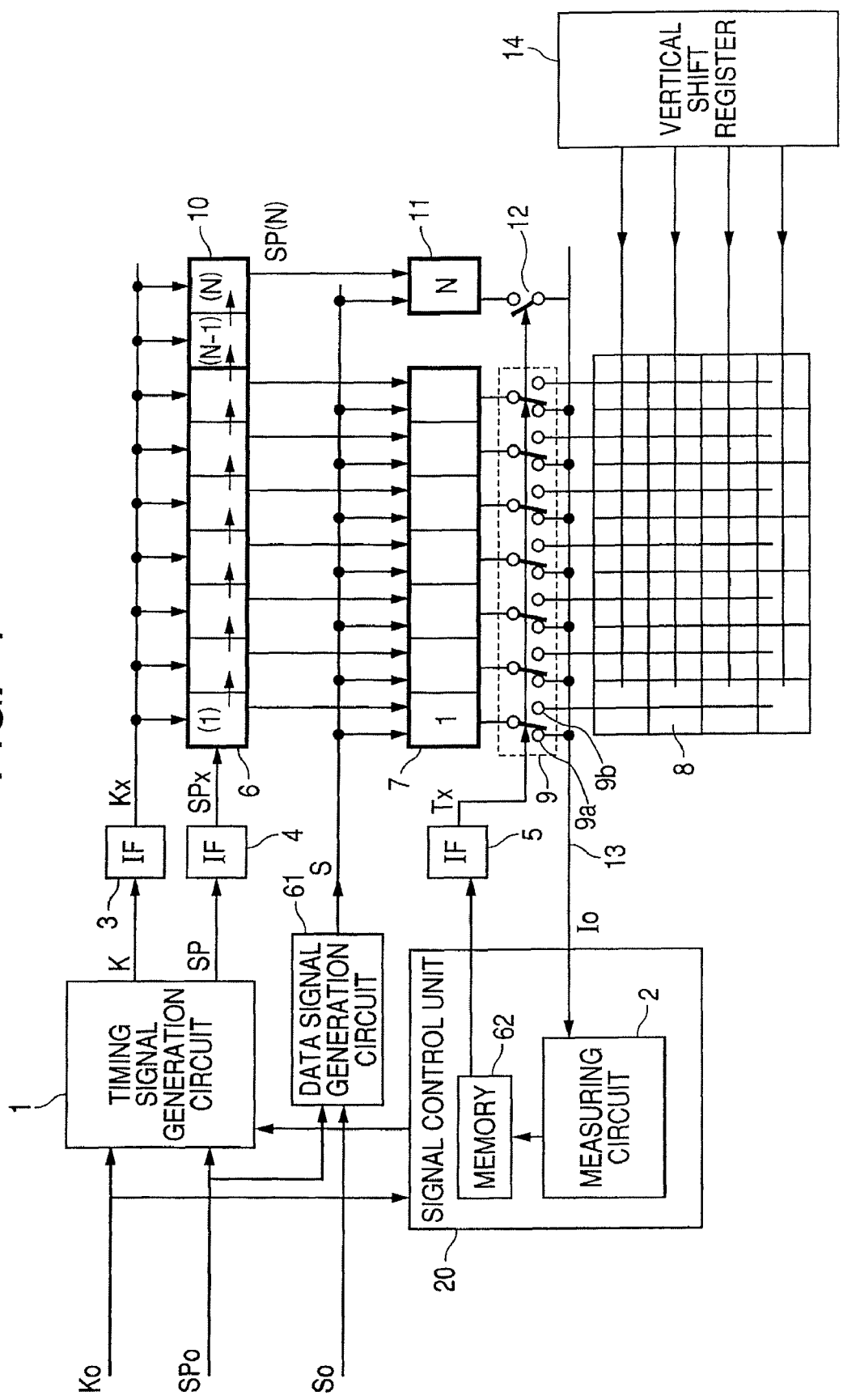
FIG. 4 is a block diagram for describing a second exemplary embodiment of the present invention.

FIG. 4 is a block diagram for describing the second exemplary embodiment of the present invention. In FIG. 4, since the same constitutional elements as those in the first exemplary embodiment illustrated in FIG. 1 have the same reference numerals and symbols as those illustrated in FIG. 1 respectively, the descriptions thereof will be omitted. In FIG. 4, the number of columns of the image display panel is set to "N−2". As illustrated in FIG. 4, the register 10 added and extended for timing adjustment is a two-stage shift register which is constituted as well as the shift register 6, and this extension register 10 is added to the last stage of the shift register 6. That is, the shift register having the (N−2) stages and the extension two-stage register 10 together constitute the shift register totally having the continuous N stages. More specifically, the extension register 10 acts as the (N−1)th stage and the N-th stage of the N-stage shift register.

In the present exemplary embodiment, the additional sampling circuit 11 is provided only for the last (N-th) stage of the extension register 10. Then, as well as the sampling circuits in the sampling circuit group 7, the sampling signal SP(N) of the N-th stage of the shift register and the serial signal S are input to the additional sampling circuit 11, and the sampling current is then output to the common output line 13 through the switch 12. Here, since an additional sampling circuit corresponding to the output from the (N−1)th stage of the shift register is not provided, any sampling is not executed at output timing of this stage.

Figure 5:
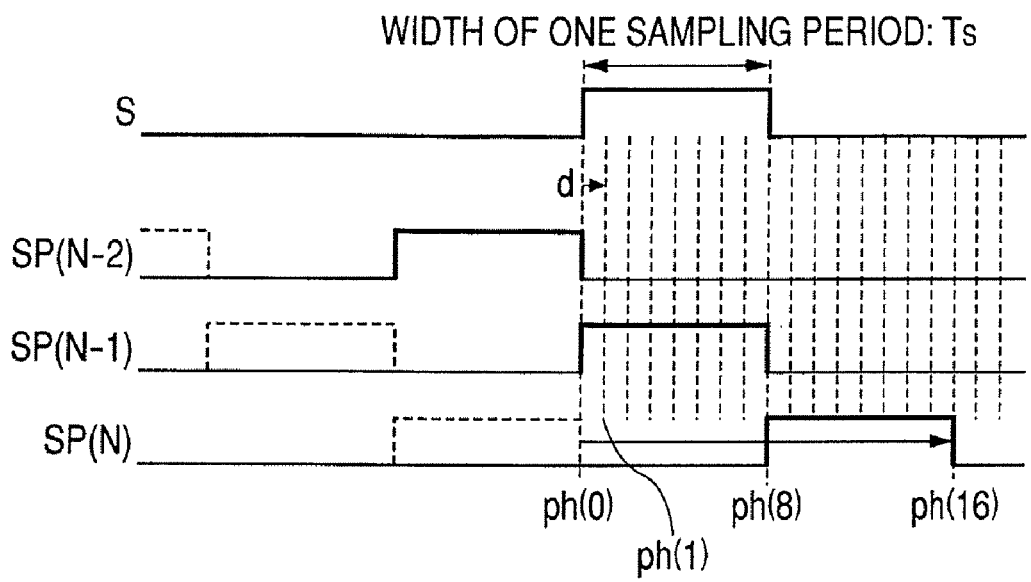
FIG. 5 is a timing chart for describing the operation in FIG. 4.
Figure 6:
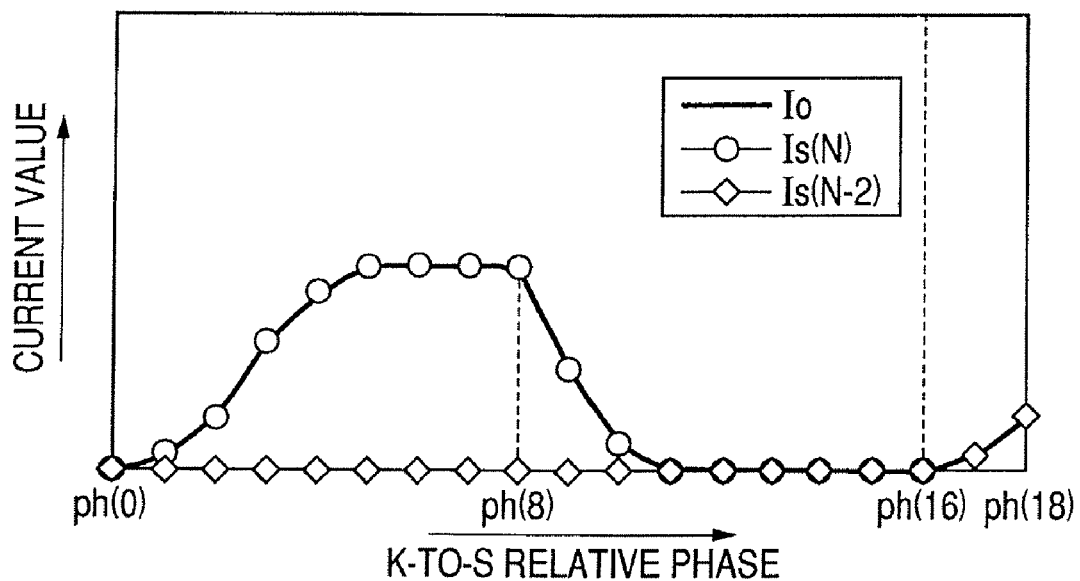
FIG. 6 is a diagram for describing sampling phase detection in the second exemplary embodiment.

FIG. 5 is a timing chart in sampling phase detection, and FIG. 6 is a diagram for describing the sampling phase detection in the second exemplary embodiment. Here, it should be noted that the detection range is twice the one sampling period Ts of the first exemplary embodiment, that is, the detection range in the present exemplary embodiment begins at the phase ph(0) and ends at the phase ph(16).

As illustrated in FIG. 5, in one sampling period width Ts, the phase of the analog video voltage signal S corresponds to the position where the N-th stage sampling circuit 11 has to execute sampling in the sampling timing adjustment period. During the sampling timing adjustment period, the timing signal Tx is "H" level, and the switch group 9 and the switch 12 are set to the side of the common output line.

Here, it is assumed that the phase of the sampling signal at the time of starting correction is ph(0). In FIG. 5, the (N−2)th stage sampling signal SP(N−2), the (N−1)th stage sampling signal SP(N−1) and the N-th stage sampling signal SP(N) at the phase ph(0) are illustrated by the dotted lines.

Since any sampling pulse overlapping the sampling-object signal S for sampling timing adjustment does not exist at the phase ph(0), the output of each sampling circuit is zero. The sum total current output to the common output line 13 is measured by the measuring circuit 2, and the sum total current on the common output line 13 at the phase ph(0) is thus set to Imax(0)=0, and the phase ph(0) is stored as its phase data Dp(0).

Subsequently, the timing signal generation circuit 1 changes or shifts the phases of the clock signal K and the sampling signal SP from ph(0) to ph(1) by a period "d". In FIG. 5, d=Ts/8 is given.

At the phase ph(1), the N-th sampling signal SP(N) for correction overlaps the voltage signal S for correction, whereby the N-th stage sampling circuit 11 executes sampling during the period "d". At that time, the sum total sampling output current slightly larger than that at the phase ph(0) is output to the common output line 13. Then, if the current value on the common output line 13 at the phase ph(1) is equal to or larger than the held maximum value Imax(0), the measuring circuit 2 sets the sum total current on the common output line 13 as the maximum value Imax(1), and updates and holds the phase ph(1) as the phase data Dp(1). On the other hand, if the current value on the common output line 13 at the phase ph(1) is smaller than the held maximum value Imax(0), the measuring circuit 2 does not change the maximum value Imax(0), and holds it and the phase data Dp(0) directly.

After then, if the above operation is repeated, the overlap comes to be a maximum at the phase ph(8) within the range that the fall of the N-th stage sampling signal SP(N) for correction does not exceed the fall of the analog video voltage signal S, as illustrated in FIG. 6, whereby also the sampling output comes to be a maximum. Up to this time, the phase data which has the maximum value of the sum total current on the common output line as a result of sampling is the data at the phase ph(8).

Subsequently, if the phase is changed to the phase ph(9), the fall of the N-th stage sampling signal SP(N) for correction exceeds the fall of the voltage signal S for correction, whereby the low-level portion of the correction voltage signal S is sampled. For this reason, the sampling output of the N-th stage sampling circuit 11 decreases. At that time, the (N−1)th stage sampling signal SP(N−1) overlaps the sampling-object signal S. However, since a sampling circuit which receives the (N−1)th stage sampling signal and thus executes sampling does not exist, the sampling-object signal S is not sampled. Thus, the sum total current in the sampling (or called the sampling sum total current) of which the level is lower than the state at the phase ph(8) is output to the common output line, whereby the measuring circuit 12 holds the data at the phase ph(8).

If the above operation is repeated until the phase ph(17), the overlap "d" is given between the (N−1)th sampling signal and the voltage signal S for correction. Then, the sampling circuit corresponding to the sampling signal SP(N−2) samples the analog video voltage signal S, and outputs the sampling sum total current to the common output line. The sampling sum total current on the common output line in this state is equal to the sampling sum total current by the N-th sampling signal for sampling at the phase ph(1). After that, if the above operation is repeated at the phase ph(18) and the following phases, the sampling current of the sampling signal SP(N−2) output by the corresponding sampling circuit increases, whereby the sampling sum total current on the common output line reaches a peak.

After the phase detection ends, the clock signal K and the sampling signal SP are generated at the phase that the sampling sum total current reaches the peak, whereby a suitable sampling operation can be achieved. Besides, it should be noted that the output phases of the clock signal K and the sampling signal SP are not limited to the peak of detection. That is, the output phase may be determined so as to correlate with the detected peak phase. For example, it is possible to set the output phase to a value having an offset from the peak phase.

In the phase variable range from the phase ph(0) to the phase ph(16), there is only one peak of the sampling sum total current, on the common output line, representing the sampling result. Therefore, it is possible, by providing an interval section between the adjacent sampling circuits, to make the detection range of one sampling period into two sampling periods. Since it is impossible to know the position of the pulse of the sampling-object signal before sweeping the phases, it is preferable to make the sweeping range wider. In the present exemplary embodiment, the shift register is extended by two stages, any sampling circuit corresponding to the shift register immediately next ((N−1)th stage) to the original image display shift register 6 is not provided, and the additional sampling circuit corresponding only to the last (N-th) stage is provided, whereby it is possible to make the sweeping period twice the sweeping period in the first exemplary embodiment.

Accordingly, if one wishes to make the phase sweeping width (detection range) M times as much as the sampling period Ts, one only has to provide an interval of (M−1) stages in which any sampling circuit is not provided, between the sampling circuit 11 and the sampling circuit group 7.

According to the present exemplary embodiment, it is possible to extend the available phase detection range, by providing the interval section in the column of the sampling circuits or continuously providing the sampling circuits so as not to connect or supply the output of the sampling circuit corresponding to the interval section to the common output line.

In the above description, the register 10 for correction and the sampling circuit 11 for correction are disposed respectively at the subsequent stages of the shift register 6 and the sampling circuit group 7. However, the same effect as that described above can be achieved even if the register 10 for correction and the sampling circuit 11 for correction are disposed respectively at the previous stages of the shift register 6 and the sampling circuit group 7.

Third Exemplary Embodiment

Figure 7:
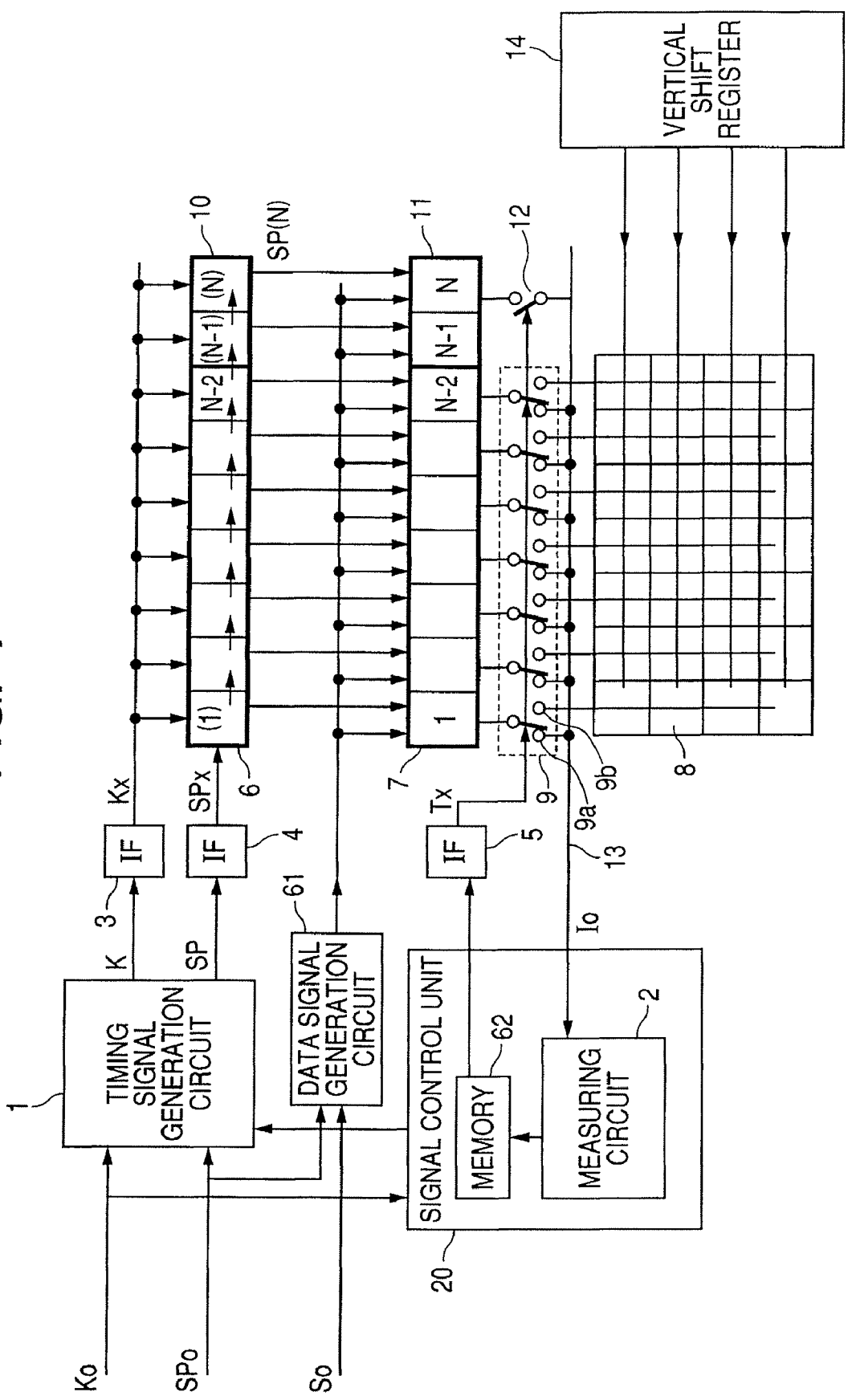
FIG. 7 is a block diagram for describing a third exemplary embodiment of the present invention.

FIG. 7 is a block diagram for describing the third exemplary embodiment of the present invention. In FIG. 7, since the same constitutional elements as those in the second exemplary embodiment illustrated in FIG. 4 have the same reference numerals and symbols as those illustrated in FIG. 4 respectively, the descriptions thereof will be omitted.

The third exemplary embodiment is different from the second exemplary embodiment in that the additional sampling circuit 11 corresponding to each of the stages of the extension portion in the shift register, and, in this connection, the sampling output of the (N−1)th stage sampling circuit adjacent to the sampling circuit group 7 is not connected or supplied to the common output line.

Figure 8:
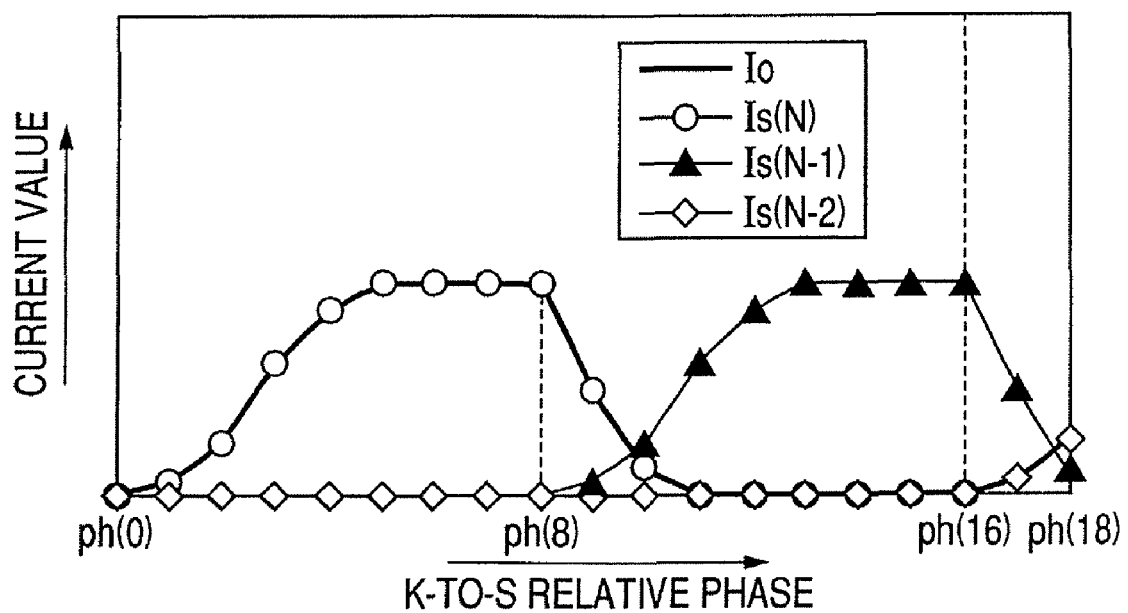
FIG. 8 is a diagram for describing sampling phase detection in the third exemplary embodiment.

FIG. 8 is a diagram for describing sampling phase detection in the third exemplary embodiment.

In FIG. 8, the output current Is(N−2) of the (N−2)th stage sampling circuit and the output current Is(N) of the N-th stage sampling circuit are respectively the same as those in the second exemplary embodiment. In any case, although the current output of the (N−1)th sampling circuit for correction is generated as illustrated in FIG. 8, the generated current is not output to the common output line. For this reason, the current Io on the common output line is the same as that in the second exemplary embodiment, whereby it is possible to extend the phase detection range by two sampling circuits, as well as the second exemplary embodiment.

After the phase detection ends, the clock signal K and the sampling signal SP are generated at the adjusted phase, whereby a suitable sampling operation can be achieved.

Besides, it should be noted that the output phases of the clock signal K and the sampling signal SP are not limited to the peak of detection. That is, the output phase may be determined so as to correlate with the detected peak phase. For example, it is possible to set the output phase to a value having an offset from the peak phase.

Accordingly, if one wishes to make the phase detection range M times as much as the sampling period Ts, one only has to provide an interval that the sampling output current of the (M−1) stage sampling circuits adjacent to the sampling circuit group 7 is not connected or supplied to the common output line.

In the above description, the extended register 10 and the sampling circuit 11 are disposed respectively at the subsequent stages of the shift register 6 and the sampling circuit group 7. However, the same effect as that described above can be achieved even if the extended register 10 and the sampling circuit 11 are disposed respectively at the previous stages of the shift register 6 and the sampling circuit group 7.

Fourth Exemplary Embodiment

Figure 9:
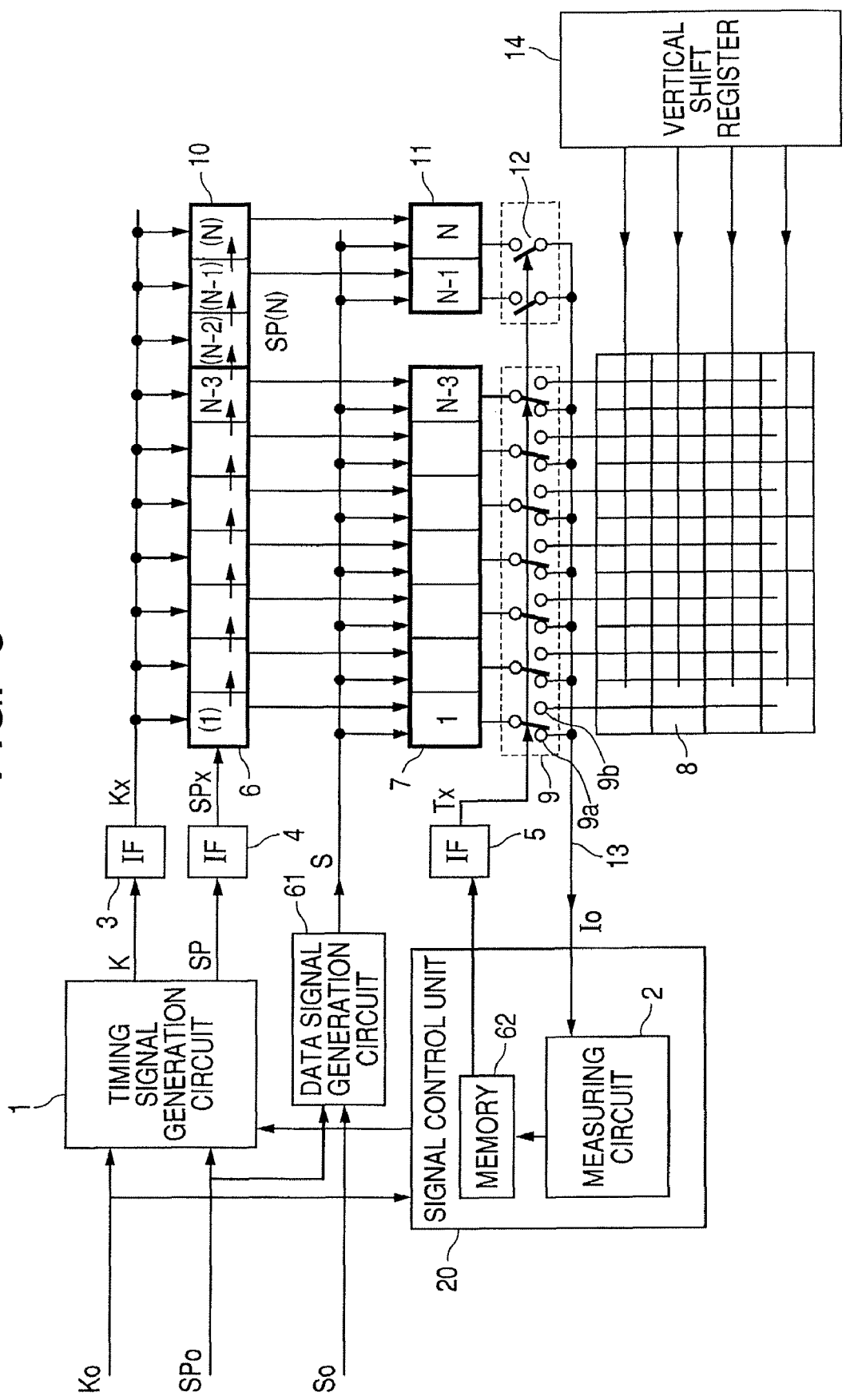
FIG. 9 is a block diagram for describing a fourth exemplary embodiment of the present invention.

FIG. 9 is a block diagram for describing a fourth exemplary embodiment of the present invention. In FIG. 9, since the same constitutional elements as those in the second exemplary embodiment illustrated in FIG. 4 have the same reference numerals and symbols as those illustrated in FIG. 4 respectively, the descriptions thereof will be omitted.

The fourth exemplary embodiment is different from the first to third exemplary embodiments in that an extension register has three stages and an additional sampling circuit has two stages. More specifically, the three-stage extension register 10 is connected lengthwise to the shift register 6, whereby the extension register 10 and the shift register 6 together constitute the continuous shift register. Further, an interval section corresponding to one stage is provided between the additional sampling circuit 11 and the sampling circuit group 7 for image display.

Since the additional sampling circuit 11 has the two stages, it is possible for a sampling-object signal to use two kinds of signals, that is, a sampling-object signal S(N−1) which has an optimum timing at the time when maximally sampled by the (N−1)th stage sampling circuit, and a sampling-object signal S(N) which has an optimum timing at the time when maximally sampled by the N-th stage sampling circuit. Here, it should be noted that the latter sampling-object signal S(N) is acquired by delaying the pulse timing of the former sampling-object signal S(N−1) by one sampling period Ts. In the present exemplary embodiment, the two kinds of sampling-object signals S(N−1) and S(N) are continuously generated, and the currents of the respective signals are detected. The above operation is repeated as shifting the timing of the sampling signal SP for each operation, whereby the optimum timing is determined based on the detected and measured result.

Figure 11:
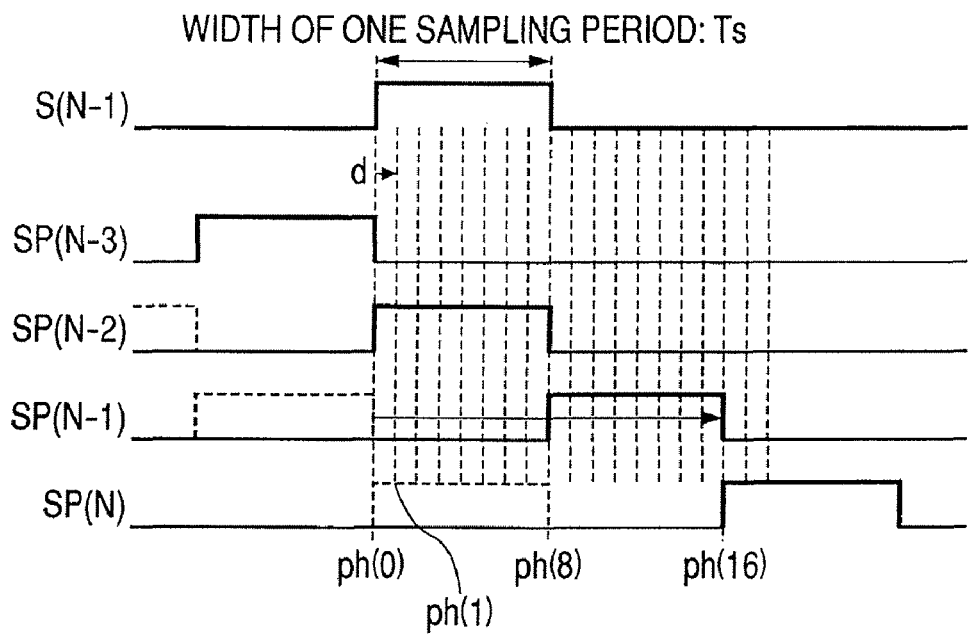
FIG. 11 is a timing chart for describing the operation to be executed in a period A illustrated in FIG. 10.
Figure 12:
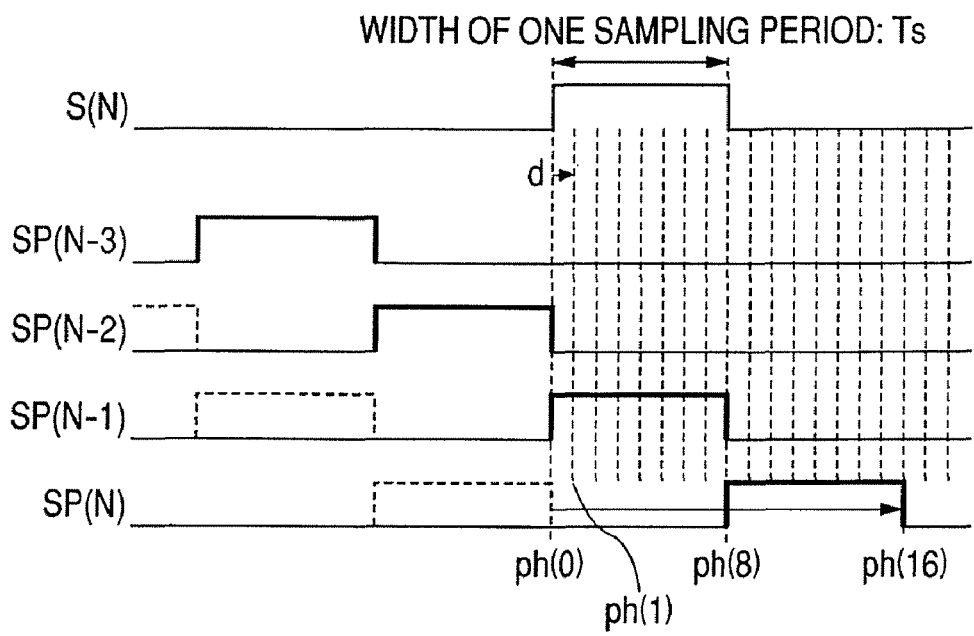
FIG. 12 is a timing chart for describing the operation to be executed in a period B illustrated in FIG. 10.

FIG. 10 discloses a generation sequence of the above two kinds of sampling-object signals. Initially, the phase of the sampling signal SP is set to ph(0), a sampling-object pulse of S(N−1) is generated in the period A, and a sampling-object pulse of S(N) is generated in the subsequent period B. After that, a similar pulse is generated by shifting the phases ph(1), ph(2), . . . , successively. FIG. 11 and FIG. 12 are timing charts respectively for describing the operations to be executed in the present exemplary embodiment. More specifically, FIG. 11 illustrates the sampling-object signal S(N−1) and the outputs of the respective stages of the shift register in the period A, and FIG. 12 illustrates the sampling-object signal S(N) and the outputs of the respective stages of the shift register in the period B.

Figure 13:
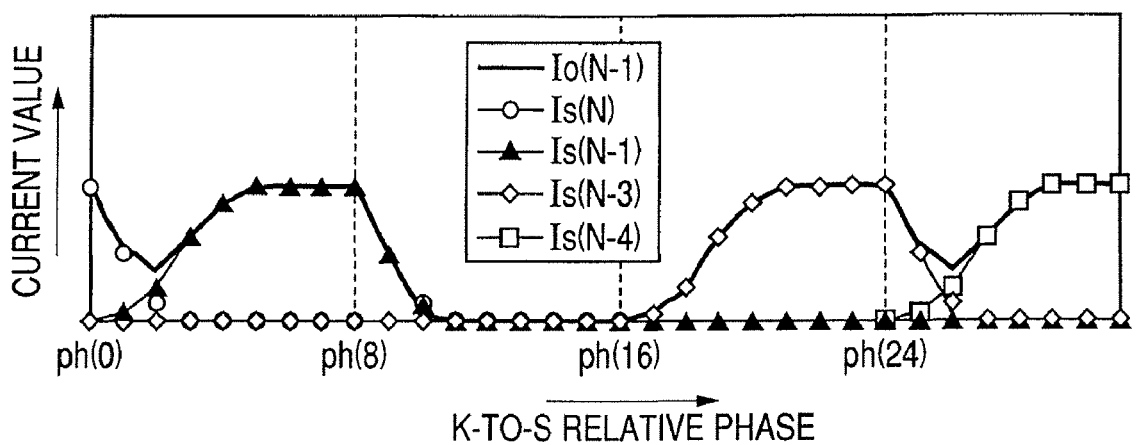
FIG. 13 is a diagram for describing sampling phase detection in the period A according to the fourth exemplary embodiment.
Figure 14:
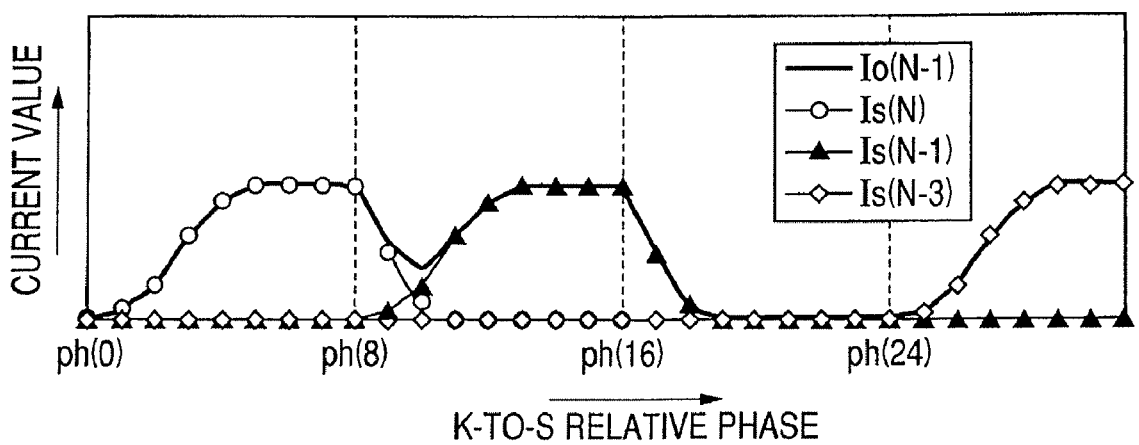
FIG. 14 is a diagram for describing sampling phase detection in the period B according to the fourth exemplary embodiment.

The sampling signal SP is swept within the range 2Ts from the phase (0) to the phase (16). At the sweeping start phase ph(0), the rise of the N-th stage sampling signal SP(N) coincides with the rise of the sampling-object signal S(N−1), and the fall of the N-th stage sampling signal SP(N) coincides with the rise of the sampling-object signal S(N). FIG. 13 is a diagram for describing the relation between the detected current value and the phase in the period A of FIG. 10, that is, when the sampling-object pulse (signal) S(N−1) is given, and FIG. 14 is a diagram for describing the relation between the detected current value and the phase in the period B of FIG. 10, that is, when the sampling-object pulse (signal) S(N) is given.

Figure 15:
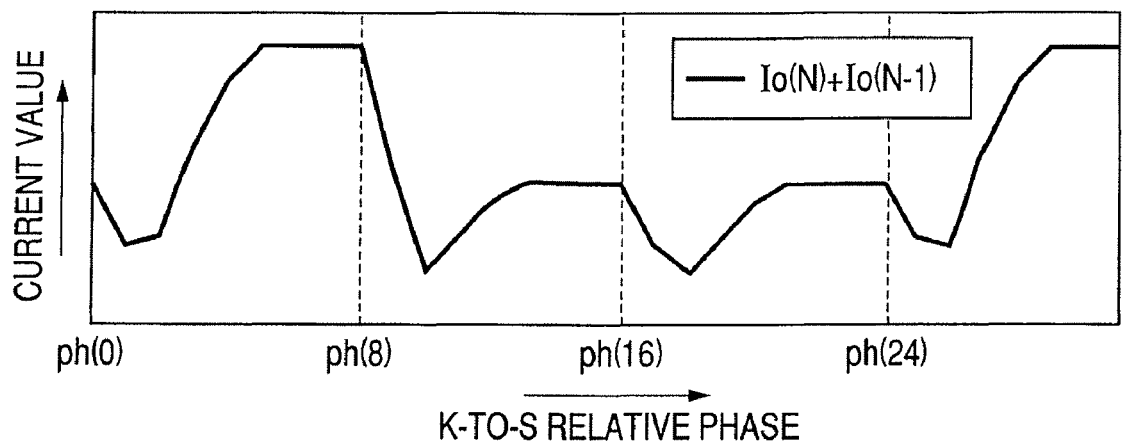
FIG. 15 is a diagram for describing the sampling phase detection in the fourth exemplary embodiment.

FIG. 15 is a diagram illustrating the sum total current during the periods A and B at each of the phases (ph(0), ph(1), . . . ). More specifically, the currents detected during the periods A and B are stored by the measuring circuit 2, and the sum of the stored currents is calculated to acquire the sum total current illustrated in FIG. 15.

In FIG. 11 and FIG. 12, by changing or shifting the phases of the clock signal K and the sampling signal SP within the range from the phase ph(0) to the phase ph(24), the phases of the sampling signal are likewise changed or shifted. The sum total current from the sampling circuit group 7 and the sampling circuit 11 for correction in this state are output to the common output line, and then the output current is input to the measuring circuit 2.

Then, the measuring circuit 2 first holds the sampling sum total current on the common output line 13 in the period A, during the period A of the phase ph(0). Subsequently, after detecting the sampling sum total current on the common output line 13 in the period B, the measuring circuit 2 adds together the sampling sum total current in the period A and the sampling sum total current in the period B, and holds the acquired value as the maximum value.

Next, the measuring circuit 2 detects and holds the sampling sum total current on the common output line 13 in the period A, during the period A of the phase ph(1). Subsequently, after detecting the sampling sum total current on the common output line 13 in the period B, the measuring circuit 2 adds together the sampling sum total current in the period A and the sampling sum total current in the period B. Here, if the acquired value is equal to or larger than the relevant maximum value, the measuring circuit 2 holds the sampling sum total current in the period A and the sampling sum total current in the period B at the phase ph(1), as the maximum value. After that, the above operation is repeated in regard to the phases of the clock signal K and the sampling signal SP and the phase of the voltage signal S for correction, along the sequence illustrated in FIG. 10.

In FIG. 15, in the three sampling periods from the phase (0) to the phase (24), there is only one peak of the current Io in the period A and the period B. Then, if the operation is continued at the phase ph(24) and the following phases, a peak appears for each one sampling period.

After the phase detection ends, the clock signal K and the sampling signal SP are generated at the phase that the sampling sum total current reaches the peak, whereby a suitable sampling operation can be achieved. Besides, it should be noted that the output phases of the clock signal K and the sampling signal SP are not limited to the peak of detection. That is, the output phase may be determined so as to correlate with the detected peak phase. For example, it is possible to set the output phase to a value having an offset from the peak phase.

Accordingly, if one wishes to make the phase detection range M times as much as the sampling period Ts, one only has to provide a no-sampling interval of the (M−2) stages between the sampling circuit 11 for correction and the sampling circuit group 7.

In the fourth exemplary embodiment, as illustrated in FIG. 9, it is possible, by providing an interval section between the sampling circuit group 7 for image display and the sampling circuit 11 for correction, to make two or more detection peaks into one detection peak in the phase detection period of one or more sampling periods. In addition, it is possible to achieve the same effect as above by successively providing the sampling circuit 11 between the sampling circuit group 7 and the sampling circuit 11 for correction, and causing no supply of the output of the sampling circuit of the stage adjacent to the image display shift register to the common output line 13.

The above fourth exemplary embodiment of the present invention is particularly available in a case where the shift register has the constitution that there is a possibility that an error occurs in the pulse widths of the odd-numbered sampling signal, the even-numbered sampling signal, and the sampling-object signal.

That is, if the pulse width of the odd-numbered sampling signal and the pulse width of the even-numbered sampling signal are different, the peak values and the peak phases in FIG. 13 and FIG. 14 are different, whereby there is a possibility that either the even-numbered sampling operation or the even-numbered sampling operation is not suitably set.

It is possible, by evaluating detection of the sampling result with use of the sum of the odd-number sampling and the even-number sampling, to determine the phases suitably for both the odd-number sampling and the even-number sampling.

In the above description, the extended register 10 and the sampling circuit 11 are disposed respectively at the subsequent stages of the shift register 6 and the sampling circuit group 7. However, the same effect as that described above can be achieved even if the extended register 10 and the sampling circuit 11 are disposed respectively at the previous stages of the shift register 6 and the sampling circuit group 7.

Incidentally, in the above first to fourth exemplary embodiments, the display panel to be used is not specifically limited to the EL panel. That is, also a display panel capable of controlling display of respective pixels based on current signals is applicable to the present invention. Further, in the above first to fourth exemplary embodiments, the phase of the signal S for correction is fixed, the phase of the sampling signal for correction is changed or shifted, and the phase of the timing signal is controlled based on the output of the common output line. However, it is also possible to fix the phase of the sampling signal for correction, change or shift the phase of the signal S for correction, and control the phase of the analog video signal based on the output of the common output line.

Furthermore, in the above first to fourth exemplary embodiments, the phase of the timing signal is controlled based on the maximum value of the sampling sum total current. However, it is possible to acquire an optimum phase through various operations according to the sampling sum total current value. For example, it is possible to control the phase based on a differentiated value of the sampling sum total current.

In any case, the display device as described in each of the above first to fourth exemplary embodiments can constitute an information display device for a mobile phone, a mobile personal computer, a still camera, a video camera, and the plural functions thereof. The information display device includes an information input unit. More specifically, the information input unit of the mobile phone includes an antenna, the information input unit of a PDA (Personal Digital Assistant) or the mobile personal computer includes an interface unit for networks, and the information input unit of the still camera or the video camera includes a sensor such as a CCD (charge-coupled device) or a CMOS (complementary metal-oxide semiconductor).

In the following, a digital camera to which the display device as described in each of the first to fourth exemplary embodiments is applied will be described.

Figure 16:
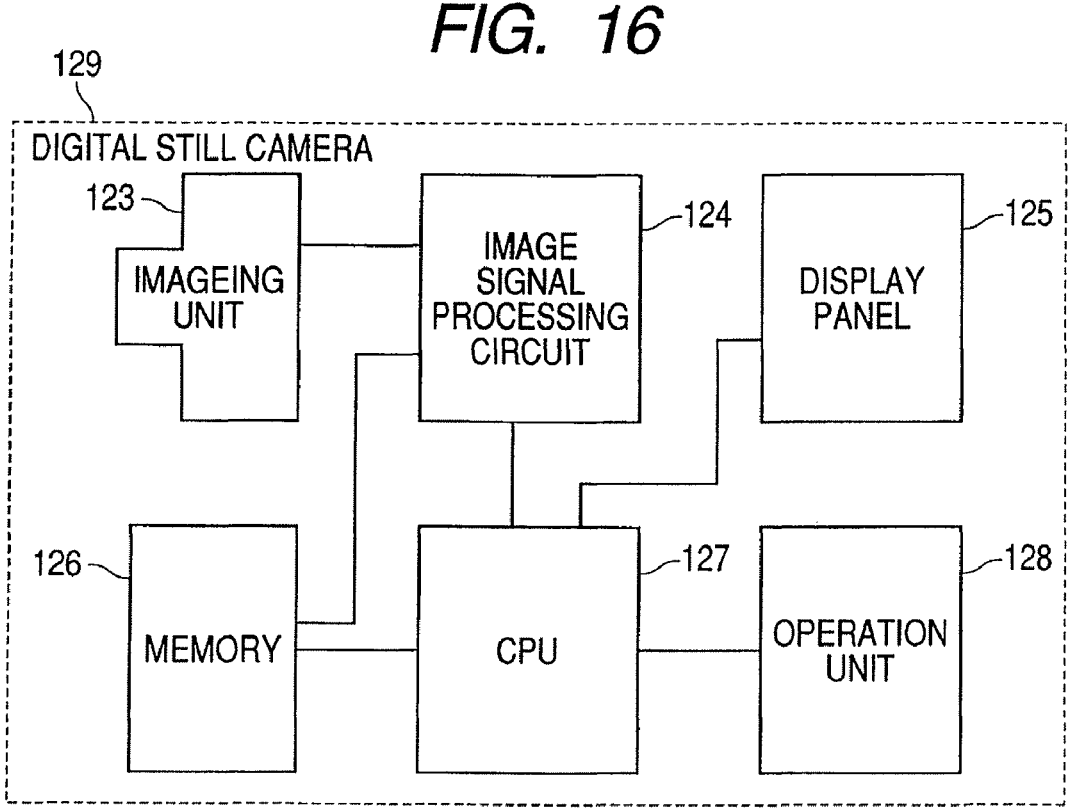
FIG. 16 is a block diagram illustrating an example of a digital still camera.

FIG. 16 is a block diagram illustrating an example of a digital still camera 129. As illustrated in FIG. 16, the digital still camera 129 includes an imaging unit 123 for capturing a subject, an image signal processing circuit 124, a display panel 125, a memory 126, a CPU 127 and an operation unit 128. More specifically, an image signal captured by the imaging unit 123 or stored in the memory 126 is subjected to a signal process by the image signal processing circuit 124, and then the processed image signal can be displayed and viewed on the display panel 125. In response to an input from the operation unit 128, the CPU 127 controls the imaging unit 123, the memory 126 and the image signal processing circuit 124, whereby it is possible to execute imaging, image capturing, image recording, image reproducing and image displaying which are suitable for various situations.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-098350, filed on Mar. 31, 2006, which is hereby incorporated by reference herein in its entirety.

What is claimed is:

1. A display device which includes a sampling device and an image display section, comprising:
    (a) a timing signal generation circuit adapted to generate a timing signal delayed with respect to a reference clock signal;
    (b) a control circuit adapted to control a delay time of the timing signal;
    (c) a data generation circuit adapted to generate a serial data signal;
    (d) an N-stage shift register, the number of stages of which is equal to the number of columns of the image display section and to which the timing signal is input, adapted to sequentially generate sampling pulses in sync with the timing signal;
    (e) a sampling circuit, connected to any one of the stages of the shift register and the data generation circuit, adapted to sample the serial data signal during a period that the sampling pulse of the stage generating the sampling pulse is generated, and to output a current according to a sampling result; and
    (f) a common output line commonly connected to respective current outputs of the sampling circuit through a switch,
    wherein the sampling circuit includes M sampling circuits respectively connected to continuous first to M-th (<N−1) stages of the N-stage shift register, and a sampling circuit connected to a last stage of the shift register,
    wherein at least one shift register, connected to the sampling circuit whose output is not connected to the common output line through the switch, is arranged between the M-th stages of the shift register and the last stage of the shift register, wherein A. the following operations (1) to (3) are executed during a period that the switch is closed,
(1) the data generation circuit generates N serial data signals of which the last is data giving a maximum current and the others are data giving a minimum current,
(2) the timing signal generation circuit generates the timing signal delayed with respect to the reference clock signal, and
(3) the control circuit measures an output current of the common output line as sweeping of the delay time of the timing signal occurs, and decides and stores the delay time at which the measured current becomes a maximum within a range of the sweeping, and
B. the following operations (4) to (6) are executed during a period that the switch is released,
(4) the control circuit fixes the delay time of the timing signal to the stored delay time,
(5) the data generation circuit generates the serial data signal based on an externally input signal, and
(6) the timing signal generation circuit generates the timing signal on the fixed delay time to the serial data signal based on the externally input signal,
wherein the display device comprises a display panel which includes:
plural scanning electrodes extending in a row direction;
M-column column electrodes intersecting the scanning electrodes; and
plural pixels respectively arranged on an intersection portion of the scanning electrodes and the column electrodes, and
wherein, while the switch is being opened, the output terminals of the M sampling circuits are respectively connected to the M-column column electrodes.

2. A sampling device according to claim 1, wherein, in the operation (3), the control circuit sweeps the delay time in order from shorter to longer.

3. A display device according to claim 1, wherein a period that the switch is closed is set within a turn-off period of the display device.

4. A camera comprising:
a display device which includes a sampling device and an image display section, comprising:
(a) a timing signal generation circuit adapted to generate a timing signal delayed with respect to a reference clock signal;
(b) a control circuit adapted to control a delay time of the timing signal;
(c) a data generation circuit adapted to generate a serial data signal;
(d) an N-stage shift register, the number of stages of which is equal to the number of columns of the image display section and to which the timing signal is input, adapted to sequentially generate sampling pulses in sync with the timing signal;
(e) a sampling circuit, connected to any one of the stages of the shift register and the data generation circuit, adapted to sample the serial data signal during a period that the sampling pulse of the stage generating the sampling pulse is generated, and to output a current according to a sampling result; and
(f) a common output line commonly connected to respective current outputs of the sampling circuit through a switch,
wherein the sampling circuit includes M sampling circuits respectively connected to continuous first to M-th (<N−1) stages of the N-stage shift register, and a sampling circuit connected to a last stage of the shift register, and
wherein at least one shift register, connected to the sampling circuit whose output is not connected to the common output line through the switch, is arranged between the M-th stages of the shift register and the last stage of the shift register, wherein
A. the following operations (1) to (3) are executed during a period that the switch is closed,
(1) the data generation circuit generates N serial data signals of which the last is data giving a maximum current and the others are data giving a minimum current,
(2) the timing signal generation circuit generates the timing signal delayed with respect to the reference clock signal, and
(3) the control circuit measures an output current of the common output line as sweeping of the delay time of the timing signal occurs, and decides and stores the delay time at which the measured current becomes a maximum within a range of the sweeping, and
B. the following operations (4) to (6) are executed during a period that the switch is released,
(4) the control circuit fixes the delay time of the timing signal to the stored delay time,
(5) the data generation circuit generates the serial data signal based on an externally input signal, and
(6) the timing signal generation circuit generates the timing signal on the fixed delay time to the serial data signal based on the externally input signal,
wherein the display device comprises a display panel which includes:
plural scanning electrodes extending in a row direction;
M-column column electrodes intersecting the scanning electrodes; and
plural pixels respectively arranged on an intersection portion of the scanning electrodes and the column electrodes, and
wherein, while the switch is being opened, the output terminals of the M sampling circuits are respectively connected to the M-column column electrodes;
an imaging unit adapted to capture a subject; and
an image signal processing unit adapted to process an image signal captured by the imaging unit,
wherein the image signal processed by the image signal processing unit is displayed on the display device.

5. A display device which includes a sampling device and an image display section, comprising:
(a) a timing signal generation circuit adapted to generate a timing signal delayed with respect to a reference clock signal;
(b) a control circuit adapted to control a delay time of the timing signal;
(c) a data generation circuit adapted to generate a serial data signal;
(d) an N-stage shift register, the number of stages of which is equal to the number of columns of the image display section and to which the timing signal is input, adapted to sequentially generate sampling pulses in sync with the timing signal;
(e) a sampling circuit, connected to any one of the stages of the shift register and the data generation circuit, adapted to sample the serial data signal during a period that the sampling pulse of the stage generating the sampling pulse is generated, and to output a current according to a sampling result; and
(f) a common output line commonly connected to respective current outputs of the sampling circuit through a switch, wherein the sampling circuit includes M sampling circuits respectively connected to continuous first to M-th (<N−1) stages of the N-stage shift register, and a sampling circuit connected to a last stage of the shift register, and a sampling circuit is not provided between the M sampling circuits and the sampling circuit connected to the last stage of the shift register, A. the following operations (1) to (3) are executed during a period that the switch is closed,
 (1) the data generation circuit generates N serial data signals of which the last is data giving a maximum current and the others are data giving a minimum current,
 (2) the timing signal generation circuit generates the timing signal delayed with respect to the reference clock signal, and
 (3) the control circuit measures an output current of the common output line as sweeping of the delay time of the timing signal occurs, and decides and stores the delay time at which the measured current becomes a maximum within a range of the sweeping, and B. the following operations (4) to (6) are executed during a period that the switch is released,
 (4) the control circuit fixes the delay time of the timing signal to the stored delay time,
 (5) the data generation circuit generates the serial data signal based on an externally input signal, and
 (6) the timing signal generation circuit generates the timing signal on the fixed delay time to the serial data signal based on the externally input signal, wherein the display device comprises a display panel which includes:
 plural scanning electrodes extending in a row direction;
 M-column column electrodes intersecting the scanning electrodes; and
 plural pixels respectively arranged on an intersection portion of the scanning electrodes and the column electrodes, and wherein, while the switch is being opened, the output terminals of the M sampling circuits are respectively connected to the M-column column electrodes.

* * * * *